(12) United States Patent
Martin

(10) Patent No.: US 9,783,458 B2
(45) Date of Patent: *Oct. 10, 2017

(54) HYDROGEN SULFIDE SCAVENGER

(71) Applicant: Innophos, Inc., Cranbury, NJ (US)

(72) Inventor: Jean Valery Martin, Princeton, NJ (US)

(73) Assignee: Innophos, Inc., Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/222,436

(22) Filed: Mar. 21, 2014

(65) Prior Publication Data

US 2017/0008802 A1    Jan. 12, 2017

Related U.S. Application Data

(63) Continuation-in-part of application No. 14/170,224, filed on Jan. 31, 2014, now Pat. No. 9,441,092.

(51) Int. Cl.
| | |
|---|---|
| C04B 24/40 | (2006.01) |
| C04B 26/26 | (2006.01) |
| C08L 95/00 | (2006.01) |
| C08K 5/00 | (2006.01) |
| C08K 5/17 | (2006.01) |
| C04B 103/00 | (2006.01) |
| C04B 111/00 | (2006.01) |

(52) U.S. Cl.
CPC .............. *C04B 24/40* (2013.01); *C04B 26/26* (2013.01); *C08K 5/0091* (2013.01); *C08L 95/00* (2013.01); *C04B 2103/0086* (2013.01); *C04B 2111/00017* (2013.01); *C08K 5/175* (2013.01)

(58) Field of Classification Search
None
See application file for complete search history.

(56) References Cited

U.S. PATENT DOCUMENTS

| | | | | |
|---|---|---|---|---|
| 4,036,942 | A * | 7/1977 | Sibeud ................... | B01D 53/48 208/207 |
| 2005/0145137 | A1* | 7/2005 | Buras ..................... | C08L 95/00 106/284.3 |
| 2005/0284333 | A1* | 12/2005 | Falkiewicz ............. | C08L 95/00 106/284.04 |
| 2006/0013892 | A1* | 1/2006 | Ashmead ............... | A61K 31/28 424/600 |
| 2009/0145330 | A1* | 6/2009 | Draper ................... | B82Y 30/00 106/274 |
| 2013/0071535 | A1* | 3/2013 | Fenyvesi ................ | A61Q 5/02 426/534 |
| 2013/0320258 | A1* | 12/2013 | Lehrer ................. | B01D 53/1493 252/189 |

* cited by examiner

*Primary Examiner* — Colin W Slifka
(74) *Attorney, Agent, or Firm* — David LeCroy

(57) ABSTRACT

The present disclosure is related to a family of metals chelates for use as a hydrogen sulfide scavenger in asphalt, and the preparation thereof. The metal chelates, in particular amino acid metal chelates, are particularly efficient at reducing the hydrogen sulfide emissions of asphalt.

4 Claims, No Drawings

HYDROGEN SULFIDE SCAVENGER

CROSS REFERENCE TO RELATED APPLICATIONS

The present application is a continuation-in-part of U.S. Pat. No. 9,441,092 B2 issued 13 Sep. 2016, the entire contents of which is hereby incorporated by reference.

FIELD OF THE INVENTION

The present disclosure relates to a hydrogen sulfide scavenger for use as an additive in asphalt.

BACKGROUND OF THE INVENTION

Asphalt is commonly used in the construction and paving of roads. Asphalt is a mixture of aggregate material, such as sand, gravel, and crushed stone, with hot bitumen. The bitumen coats the aggregate material to give the asphalt, which may be spread as a uniform layer upon a road bed and compacted and smoothed with heavy rolling equipment.

Asphalt invariably contains sulfur. The amount of sulfur will depend on the origin of the crude oil, as well as the processes used to refine the crude oil, into asphalt. The sulfur may exist in different forms. For example, sulfur may be in the form of hydrogen sulfide. Hydrogen sulfide, or dihydrogen sulfide, is a chemical compound with the formula $H_2S$. It is a colorless, poisonous, flammable gas with the characteristic foul odor.

Hydrogen sulfide may be released form asphalt, in particular when the asphalt is heated to a certain temperature. For example, hydrogen sulfide results from the dehydrogenation reactions that occur between bitumen and sulfur at the hot mixing temperatures, e.g. temperatures greater than 140° C. Hydrogen sulfide emissions are regulated. Therefore, there exists a need to reduce the amount of hydrogen sulfide in asphalt. Accordingly, the present disclosure provides for a reduced or low release of hydrogen sulfide during the preparation of asphalt, as well as in the final asphalt material.

SUMMARY OF THE INVENTION

The present disclosure is related to a family of metals chelates for use as a hydrogen sulfide scavenger in asphalt, and the preparation thereof. The metal chelates are particularly effective at reducing hydrogen sulfide emissions from asphalt.

The present disclosure is directed towards a composition comprising a metal chelate. In some embodiments, the metal chelate is copper bis-glycinate, zinc bis-glycinate or mixtures thereof.

The present disclosure is also directed to a method of reducing hydrogen sulfide emission from asphalt or the preparation thereof, comprising adding a scavenger composition comprising a metal chelate to asphalt or an asphalt mix. In some embodiments, the metal chelate is copper bis-glycinate, zinc bis-glycinate or mixtures thereof.

The metal chelate may also be selected from the following: Copper Aspartate; Copper Carbonate; Copper Citrate; Copper Gluconate; Copper Glycinate; Copper Yeast; Iron Aspartate; Iron Citrate; Iron Fumarate; Iron Gluconate; Iron Glycinate; Molybdenum Chelate; Molybdenum Trit; Zinc Acetate; Zinc Arginate; Zinc Chelate; Zinc Ascorbate; Zinc Aspartate; Zinc Gluconate; Zinc Glycinate; Zinc Methionate; Zinc Oxide; Zinc Picolinate; and mixtures thereof.

The metal chelates can be added to the asphalt as a liquid (e.g., in solvent form), solid, powder, slurry, gel, or emulsion.

Applicant has discovered that when a metal chelate $H_2S$ scavenger is dispersed in a solvent such as glycerol, kerosene, naphta, aliphatic, aromatic or naphthenic oil or any solvent with a flash point compatible with asphalt or bitumen, said dispersion will provide similar performance to the solid form of said scavenger in the presence or not of polyphosphoric acid or other typical additives used in asphalt. In addition the liquid scavenger is stable overtime in normal storage conditions.

The preparation of the liquid scavenger follow typically the steps below:

The solvent is maintain at room temperature or heated up to a temperature below the flash point of the considered solvent Some suspension stabilizers, thinner or thickener agent could be used to improve the stability of the mixture The addition of the solid scavenger under agitation typically for 15 minutes to 10 hours. The concentration of the solid scavenger varies according to the workability of the mixture, and typically could range from 5% wt to 90% and most typically from 20 to 60% wt.

The rate of addition into the asphalt or bitumen is proportionel to its solid content and varies from 0.05 to 5%, preferably from 0.1 to 0.5% wt.

The following example illustrates the neutral impact in terms of performance grading of the addition of the liquid form of the scavenger into asphalt.

| Sample | ODSR (° C.) |
|---|---|
| Neat Bitumen A 58-28 | 58.0 |
| Neat A + 1% polyphosphoric acid-Control | 65.6 |
| Neat A + 0.2% Liquid Scavenger + 1% PPA | 65.4 |
| Neat A + 0.2% Liquid Scavenger + 1% PPA | 64.8 |
| Neat Bitumen B 58-28 | 58.7 |
| Neat B + 1% PPA - Control | 66.0 |
| Neat B + 0.2% Liquid Scavenger + 1% PPA | 65.8 |
| Neat B + 0.2% Liquid Scavenger + 1% PPA | 65.6 |
| Neat Bitumen C 58-28 | 59.8 |
| Neat C + 1% PPA - Control | 67.0 |
| Neat C + 0.2% Liquid Scavenger + 1% PPA | 66.4 |
| Neat C + 0.2% Liquid Scavenger + 1% PPA | 66.5 |

Original Dynamic Shear Rheometer (ODSR)

EXAMPLES

Example 1

Hydrogen sulfide emissions were measured from asphalt samples containing a metal chelate versus a control containing no metal chelate. Three asphalt samples were prepared and their hydrogen sulfide emissions measured after 1 hour in storage. To two samples, 0.5% metal chelate additive was added—CuGlyc (copper bis-glycinate) and ZnGlyc (zinc bis-glycinate), respectively. The hydrogen sulfide emissions were measured again after 5 minutes and 1 hour. Table 1 lists the results. The addition of the metal chelate showed significant reduction in hydrogen sulfide emissions.

TABLE 1

Hydrogen Sulfide Emission

| % Additive | Temp | H₂S (ppm) Storage at 160, one hour | H₂S (ppm) 5 minutes after addition of scavenger | H₂S (ppm) 1 hour after adding scavenger material |
|---|---|---|---|---|
| 0 | Control | 180° C. | 16 | | 10 |
| 0.5 | CuGlyc | 180° C. | 12 | 4 | 1 |
| 0.5 | ZnGlyc | 180° C. | 10 | 5 | 1 |

Example 2

Additional metal chelates that may be used in asphalt, or the preparation thereof, are listed in Table 2.

TABLE 2

Metal Chelates

| Metal | Chelating agent |
|---|---|
| Chromium | Amino Acid |
| | Arginate Chloride |
| | Dinicotinate/Glycinate |
| | Picolinate |
| | Nicotinate |
| | TritChromium Yeast |
| Copper | Amino Acid |
| | Aspartate |
| | Carbonate |
| | Citrate |
| | Gluconate |
| | Sulfate |
| | Yeast |
| Iron | Amino Acid |
| | Aspartate |
| | Bis-Glycinate |
| | Citrate |
| | Fumarate |
| | Gluconate |
| | Sulfate |
| | Yeast |
| Manganese | Amino Acid |
| | Aspartate |
| | Carbonate |
| | Citrate |
| | Gluconate |
| | Sulfate |
| | Yeast |
| Molybdenum | Amino Acid |
| | TritMolybdenum |
| | Yeast |
| | Sodium Molybdate |

TABLE 2-continued

Metal Chelates

| Metal | Chelating agent |
|---|---|
| Selenium | Amino Acid |
| | Aspartate |
| | L-Selenomethionine |
| | Yeast |
| | Sodium Selenate |
| | Sodium Selenite |
| Strontium | Aspartate |
| | Citrate |
| | Glycinate |
| Vanadium | Amino Acid |
| | Citrate |
| | Bis-Maltolato Oxo Vanadium |
| | Vanadyl Sulfate |
| | Sodium Metavanadate |
| Zinc | Acetate |
| | Arginate |
| | Amino Acid |
| | Ascorbate |
| | Aspartate |
| | Gluconate |
| | Glycinate |
| | Methionate |
| | Picolinate |
| | Sulfate |
| | Yeast |

What is claimed is:

1. A scavenger composition comprising:
   5 wt % to 90 wt %, based on total weight of the composition, of a metal chelate chosen from the group consisting of Copper Aspartate; Copper Gluconate; Copper Bis-Glycinate; Iron Aspartate; Iron Glycinate; Iron Fumarate; Iron Gluconate; Molybdenum Chelate; Molybdenum Trit; Zinc Arginate; Zinc Ascorbate; Zinc Aspartate; Zinc Gluconate; Zinc Bis-Glycinate; Zinc Methionate; Zinc Picolinate; and mixtures thereof; and
   a solvent having a flash point compatible with asphalt or bitumen;
   wherein the scavenger composition is able to reduce hydrogen sulfide emissions from asphalt.

2. The scavenger composition of claim 1, wherein the metal chelate is selected from the group consisting of copper bis-glycinate and zinc bis-glycinate.

3. A method of reducing hydrogen sulfide emission from asphalt or from the preparation of asphalt, comprising adding the scavenger composition of claim 1 to asphalt.

4. The method of claim 3, wherein the asphalt further comprises polyphosphoric acid.

* * * * *